United States Patent
Berryessa (10) Patent No.: US 9,944,379 B2
(45) Date of Patent: Apr. 17, 2018

(54) MOISTURE PATH CLOSE-OUT AND THERMAL CONTROL SYSTEM AND METHODS OF ASSEMBLING SAME

(71) Applicant: THE BOEING COMPANY, Chicago, IL (US)

(72) Inventor: Brian Patrick Berryessa, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/257,563

(22) Filed: Sep. 6, 2016

(65) Prior Publication Data

US 2018/0065726 A1    Mar. 8, 2018

(51) Int. Cl.
  *F16J 15/02* (2006.01)
  *B64C 1/06* (2006.01)
  *B64F 5/00* (2017.01)

(52) U.S. Cl.
  CPC ............ *B64C 1/067* (2013.01); *B64F 5/0009* (2013.01)

(58) Field of Classification Search
  CPC .............................. B64C 1/067; B64F 5/0009
  USPC .......................................................... 277/637
  See application file for complete search history.

(56) References Cited

U.S. PATENT DOCUMENTS

| 4,235,398 A | 11/1980 | Johnson |
| 5,067,291 A * | 11/1991 | Evensen ............. E04D 13/1407 |
| | | 285/42 |
| 5,577,688 A | 11/1996 | Sloan |
| 5,779,193 A | 7/1998 | Sloan |
| 5,788,184 A | 8/1998 | Eddy |
| 5,827,598 A * | 10/1998 | Larsen ................... B64C 1/066 |
| | | 156/293 |
| 6,315,849 B1 | 11/2001 | Ross |
| 2003/0024185 A1* | 2/2003 | Menzies ................ E04D 13/14 |
| | | 52/219 |
| 2012/0126059 A1 | 5/2012 | Piuzzi et al. |
| 2013/0009010 A1* | 1/2013 | Auriac ................... B64C 1/403 |
| | | 244/129.1 |

(Continued)

FOREIGN PATENT DOCUMENTS

| DE | 85355427 U1 | 2/1986 |
| GB | 2230062 A | 10/1990 |

OTHER PUBLICATIONS

Extended European Search Report for Application No. 17175332.0, published Jan. 15, 2018.

*Primary Examiner* — Nathan Cumar
(74) *Attorney, Agent, or Firm* — Coats & Bennett, PLLC (57) ABSTRACT

A moisture control assembly for use with a support beam extending through an insulation layer is provided. The insulation layer is positioned between an outer wall and an inner wall. The assembly includes: a moisture path close-out structure coupled to the insulation layer at an aperture defined through the insulation layer, the moisture path close-out structure including an opening substantially aligned with the aperture and configured to receive the support beam therethrough; and a coupling mechanism configured to secure the moisture path close-out structure to the support beam such that the moisture path close-out structure is partially pulled away from the insulation layer, the coupling mechanism and the moisture path close-out structure configured to direct liquid flow down and away from the support beam and along the insulation layer.

16 Claims, 6 Drawing Sheets

(56) References Cited

U.S. PATENT DOCUMENTS

2013/0020434 A1* 1/2013 Muller .................... B64C 1/40
              244/1 N
2013/0168496 A1  7/2013 Roth

* cited by examiner

MOISTURE PATH CLOSE-OUT AND THERMAL CONTROL SYSTEM AND METHODS OF ASSEMBLING SAME

FIELD

The present disclosure generally relates to the moisture control field. More particularly, the present disclosure relates to the field of moisture control in a vehicle.

BACKGROUND

In an aircraft, the outer skin is spaced from the walls and ceiling of a passenger cabin (or other compartment), and the gap is at least partially filled with an insulation layer or blanket. The insulation layer is typically formed from a waterproof material. During a flight, liquid from moist air can condense against the skin and freeze during cruise. During decent, this frozen liquid can thaw and drip back down towards the cabin. Because the insulation blanket is waterproof, the condensate can flow along the insulation blanket and drain into the bilge. However, at some locations, structures and/or supports can protrude through the insulation blanket. For example, the supports that hold monuments and bins to the crown extend from the structure at the skin, through the insulation blanket, and into the cabin. The insulation blankets come with predefined holes for the supports to extend through the blanket. The holes are lined, and there may be a gap defined between the inner surface of the hole and the support. When liquid thaws, it can drip down through the hole and into the cabin.

One previous attempt to fix this problem was to wrap the support in felt so the felt will absorb the condensate and allow the condensate to evaporate back into the air. However, the condensate may be more than the felt can absorb. Further, wrapping each support in felt can be time-consuming.

BRIEF SUMMARY

There is provided, a moisture control assembly for use with a support extending through an insulation layer, the insulation layer positioned between an outer wall and an inner wall, the assembly comprising: a moisture path close-out structure coupled to the insulation layer at an aperture defined through the insulation layer, the moisture path close-out structure including an opening substantially aligned with the aperture and configured to receive the support therethrough; and, a coupling mechanism configured to secure the moisture path close-out structure to the support such that the moisture path close-out structure is partially pulled away from the insulation layer, the coupling mechanism and the moisture path close-out structure configured to direct liquid flow down and away from the support and along the outboard surface insulation layer.

In an aspect, the coupling mechanism and moisture path close-out structure are configured to restrict air flow through the aperture when the moisture path close-out structure is secured to the support and coupled to the insulation layer.

In an aspect, the moisture path close-out structure is coupled to the insulation layer facing the outer wall.

In an aspect, the coupling mechanism is configured to partially pull the moisture path close-out structure away from the insulation layer and towards the outer wall, when the moisture path close-out structure is secured to the support.

In an aspect, the moisture path close-out structure is a patch placed over the insulation layer.

In an aspect, the coupling mechanism further comprises a flange, diverging towards the insulation layer, attached to or integral with the support.

In an aspect, the moisture path close-out structure is attached to a side of the flange facing the insulation layer.

In an aspect, the flange is reversibly attached to the support.

In an aspect, the coupling mechanism further comprises a plug configured for insertion into a flange cavity, securing the moisture path close-out structure in the flange cavity between the flange and the plug.

In an aspect, the moisture path close-out structure is secured to the plug.

In an aspect, the moisture path close-out structure is secured to the support by at least one of compression fit and friction fit between the flange and the plug.

In an aspect, the coupling mechanism further comprises at least one fastener screw or tab or adhesive to attach the plug to the flange.

In an aspect, the moisture control assembly further comprises a filler disposed between the moisture path close-out structure and the insulation layer.

In an aspect, the filler is configured to mechanically press the plug into the flange cavity.

In an aspect, the moisture path close-out structure is reversibly secured to the support.

In an aspect, the moisture path close-out structure is umbrella-shaped.

In an aspect, the moisture control assembly further comprises an insulating material positioned between the support and at least one of the inner wall and outer wall.

In an aspect, the moisture control assembly further comprises an insulating material wrapped around at least a portion of the support.

In an aspect, the support is constructed of a material of low thermal conductivity.

There is further provided, a method for assembling a moisture path close-out and thermal control system for use with a support extending through an insulation layer, the insulation layer positioned between an outer wall and an inner wall, the method including: inserting the support through an aperture defined through the insulation layer and an opening defined through a moisture path close-out structure, the moisture path close-out structure coupled to the insulation layer; coupling the moisture path close-out structure to the support using a coupling mechanism; and, pulling a portion of the moisture path close-out structure away from the insulation layer such that the coupling mechanism and the moisture path close-out structure are configured to direct liquid flow down the support away from the support and along the insulation layer.

In an aspect, the coupling comprises securing the moisture path close-out structure between a flange located on the support and a plug inserted therein.

Unless otherwise defined, all technical and/or scientific terms used herein have the same meaning as commonly understood by one of ordinary skill in the art to which the disclosed aspects pertain. Although methods and materials similar or equivalent to those described herein can be used in the practice or testing of aspects, exemplary methods and/or materials are described below. In case of conflict, the patent specification, including definitions, will control.

In addition, the components, materials, methods, and examples are illustrative only and are not intended to be necessarily limiting.

Implementation of the method and/or system of aspects of the disclosed aspects can involve performing or completing selected tasks manually, automatically, or a combination thereof. Moreover, according to actual instrumentation and equipment of aspects of the method and/or system of the application, several selected tasks could be implemented by hardware, by software or by firmware or by any combination thereof, using for instance an operating system.

BRIEF DESCRIPTION OF THE DRAWINGS

Some aspects are herein described, by way of example only, with reference to the accompanying drawings and/or images. With specific reference now to the drawings in detail, it is stressed that the particulars shown are by way of example, and not necessarily to scale, and are for purposes of illustrative discussion of the aspects.

DESCRIPTION

Generally

The present disclosure generally relates to the moisture control field. More particularly, the present disclosure relates to the field of moisture control in a vehicle.

Figure 1:
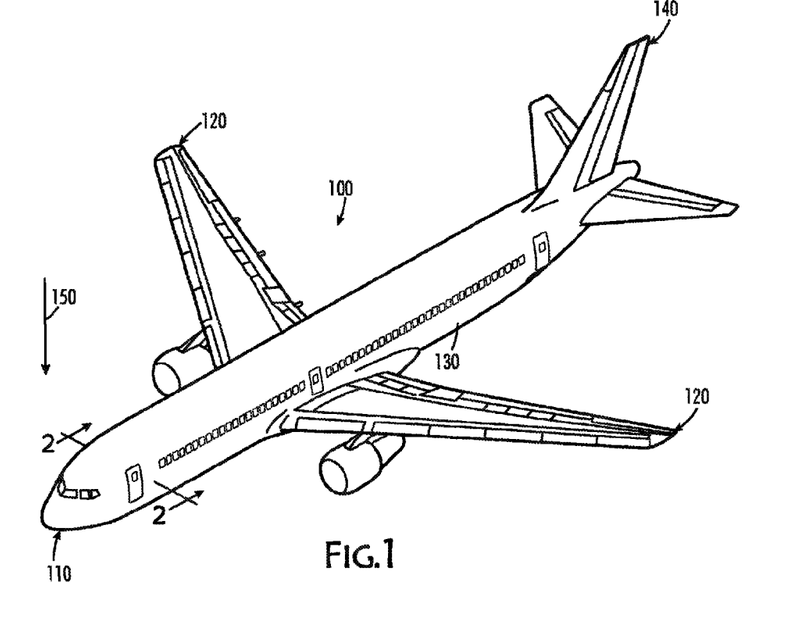
FIG. 1 is a schematic diagram of an aircraft.
Figure 2:
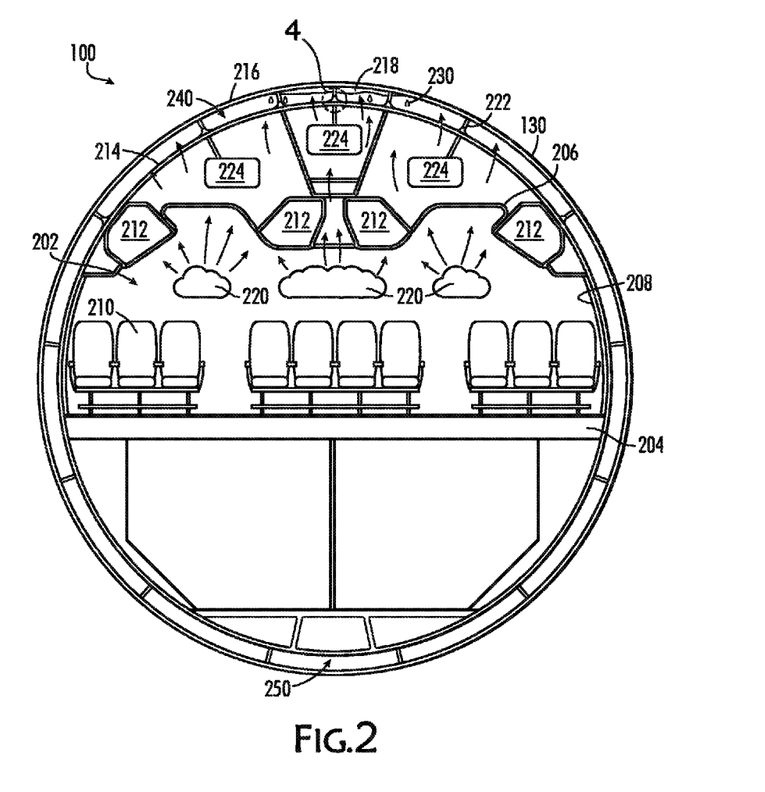
FIG. 2 is an exemplary cross-sectional, schematic view of an aircraft.

FIGS. 1-2 illustrate moisture flow in an exemplary aircraft, while FIGS. 3-6 show an exemplary moisture path close-out and thermal control system for preventing or at least minimizing moisture flow into an inner cabin portion of the aircraft, according to some aspects of the disclosure. FIG. 1 shows an aircraft 100 that includes a nose 110, wings 120, a fuselage 130, and a tail 140. FIG. 1 also illustrates a downward arrow 150 indicating the expected direction in which the force of gravity will pull objects, such as liquid water, onboard an aircraft 100 in a nominal operational profile.

Figure 4:
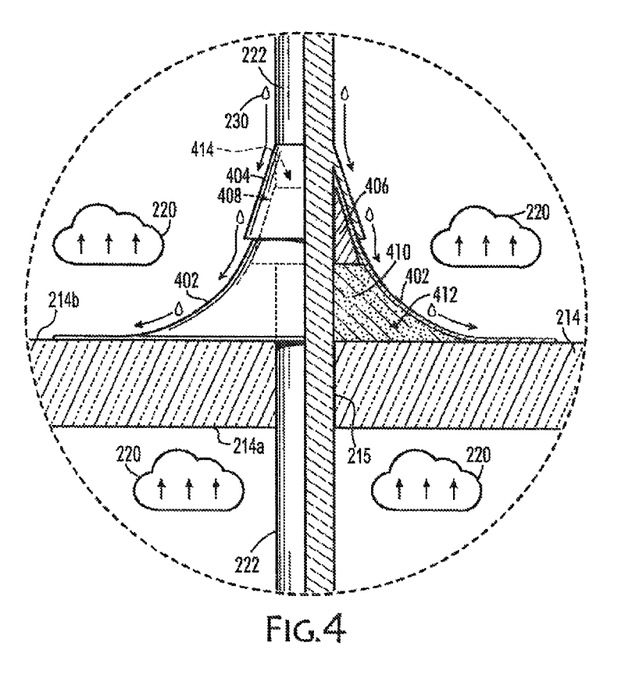
FIG. 4 is an exemplary side, partial cross-sectional view of a portion of a moisture path close-out and thermal control system.

FIG. 2 is a cross-sectional, schematic view of the aircraft 100 indicated by view arrows 2 in FIG. 1. FIG. 2 illustrates a portion of the aircraft fuselage 130, simplified for easier understanding of this Description. The fuselage 130 includes floor 204, ceiling 206, and aesthetic fascia walls 208 which define the cabin 202, where the ceiling 206 and/or aesthetic fascia walls 208 represent an "inner wall" of the aircraft for the purposes of this Description. Passengers in the aircraft 100 may congregate in seats 210 of the cabin 202 during flight. FIG. 2 illustrates that, inside of the fuselage 130 (e.g. in cabin 202), respiration and other sources of water cause moisture 220 to enter or form in the air in the cabin 202. For example, warm exhaled air includes moisture 220 and rises upward through luggage compartments 212. Some of this warm and moist air rises through the ceiling 206. Furthermore, some warm air continues to rise upward through an insulation layer 214 (or insulation blanket) into a space 240 between the insulation layer 214 and an outer wall 216 of the aircraft, also known as the aircraft skin. The insulation layer 214 includes an inboard surface 214a and an outboard surface 214b as shown in FIG. 4. Also as shown in FIG. 4, an aperture 215 extends through the insulation layer 214, including through the inboard surface 214a and the outboard surface 214b.

Referring again to FIG. 2, as the skin 216 is cooled by the outside air at high altitude during flight, the temperature of the skin 216 eventually decreases to a temperature below the freezing temperature of water. This cooling causes moisture 220 (e.g., water) to condense out of the air in the space 240 and freeze onto the inner surface of the skin 216 as ice 218. As the aircraft changes to a lower altitude and/or commences descent for landing and the temperature increases, the ice 218 begins to melt causing water droplets 230 to travel through the space 240 towards the bottom 250 of the fuselage 130, drawn by gravitational force 150. Some water droplets 230 enter gaps in the insulation layer 214, particularly where support beams 222 pass through apertures 215 within the insulation layer 214, and drip into the cabin 202, sometimes on passengers. The size of the space 240 has been exaggerated somewhat in FIG. 2 in order to more clearly show the details of the structure. Support beams 222 are often used for attaching aircraft components 224 such as luggage compartments 212, the ceiling 206, ducting, equipment, and racks, as examples. For simplicity, common aircraft load bearing components such as stringers and/or frame members are not shown, but it should be understood that in some aspects, support beams 222 attach various aircraft components to stringers and/or frame members, and not directly to the outer wall 216 of the aircraft 100.

Figure 3:
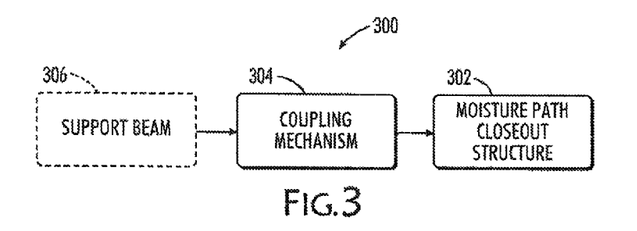
FIG. 3 is an exemplary block diagram of a moisture path close-out and thermal control system.
Figure 5:
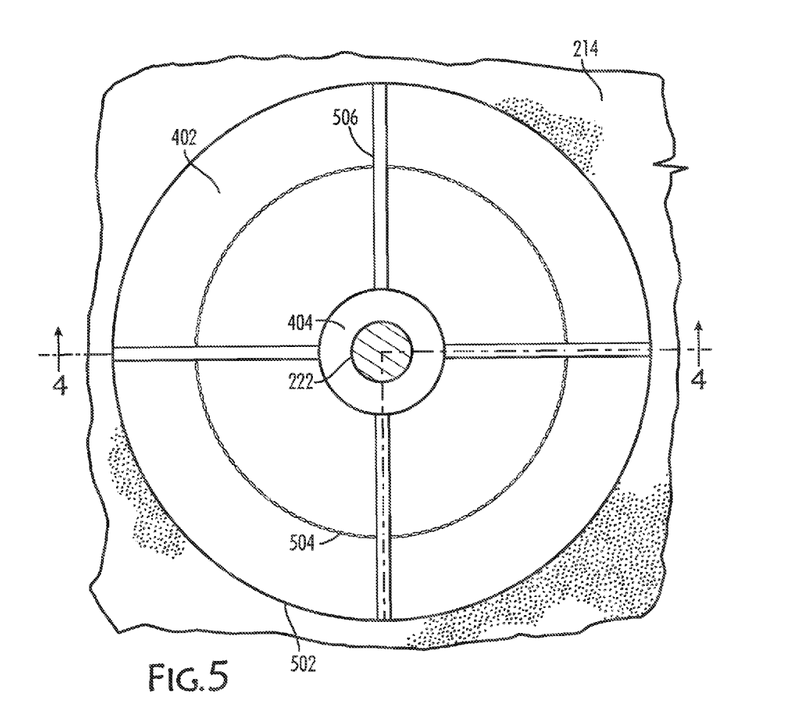
FIG. 5 is a top view of a portion of a moisture path close-out and thermal control system.

FIG. 3 is an exemplary block diagram of a moisture path close-out and thermal control system 300 (also referred to as a "moisture control system" or a "moisture control assembly"), in an aspect of the disclosure. In some aspects of the disclosure, a moisture path close-out structure 302 is provided to the system 300 at a location vulnerable to moisture leakage into the cabin 202, for example at the juncture between a support beam 222 and the insulation layer 214 where typically there is a small gap. An umbrella-shaped structure 402, shown and described in more detail with respect to FIGS. 4-5, is provided to the system 300 as the moisture path close-out structure 302, in an aspect of the disclosure. It should be understood that the umbrella-shaped structure 402 is by way of example only, and that other functionally equivalent structures could be used to prevent moisture from seeping into the junction between the insulation layer 214 and the support beam 222. In an aspect of the disclosure, the moisture path close-out structure is generally umbrella shaped at the top, but has a different shape (for example ovoid, square, irregular, rectangular, multi-sided) at the bottom, depending on the available surface area near the aperture 215 sought to be closed. The moisture path close-out structure 302 includes an opening, such as an opening 414 shown in FIG. 4. The opening substantially aligns with the aperture 215 through the insulation layer 214 and receives at least a portion of the support beam 222 therethrough.

In an aspect of the disclosure, the moisture path close-out structure 302 also substantially, or even prevents, airflow between the cabin 202 and the space 240 through the junction between the insulation layer 214 and the support beam 222. For example, the moisture path close-out structure 302 is constructed of an air impermeable material, such as existing insulation blanket cover materials (such as BMS8-380 Type 4 (Halar)—~1 perm, BMS8-380 Type 3

(MPEEK)—~0.5 perm, BMS8-380 Type 2 (PEKK)—~4 perm) and/or similar low permeable lightweight fabric. In an aspect, any material that is waterproof and can pass flammability, smoke and toxicity testing could be used. By blocking the airflow from the cabin 202, the moisture 220 from the cabin 202 is prevented from entering the space 240 and condensing and freezing on the skin 216 in the first place.

A coupling mechanism 304 is used to couple the moisture path close-out structure 302 to the support beam 222 such that moisture flowing down the support beam 222 cannot penetrate the coupling and must flow from the support beam 222 onto the moisture path close-out structure 302 and towards the insulation layer 214 (shown and described in more detail with respect to FIG. 4), where the moisture will eventually end up at the bottom 250 of the aircraft fuselage 130. In some aspects of the disclosure, the coupling mechanism 304 is an integral part of the support beam 222, optionally resulting from the support beam 222 being manufactured with the coupling mechanism 304 in the same manufacturing process. In some aspects, the coupling mechanism 304 is separate from the support beam 222 and is attached at some point prior to or as part of moisture path close-out and thermal control system installation. Such a configuration is useful for retro-fitting support beams which have already been manufactured/installed without the coupling mechanism 304, for example.

In some aspects, the coupling mechanism 304 couples the moisture close-out structure 302 to the support beam 222 using pressure/compression, adhesive, fasteners, tabs, screws and/or nails, stitching, wrapping, hook and pile fastener, zip-tie, threading (like a screw), an external pressure exerting device (such as described with respect to FIG. 4), and/or other device and/or method functionally sufficient to secure the moisture close-out structure 302 to the support beam 222 in a moisture impermeable manner.

In some aspects of the disclosure and as described in more detail below, a support beam 306, such as the support beam 222, is provided to system 300 which is configured to assist with temperature control, which has an effect on moisture control.

Umbrella-Shaped Moisture Path Close-Out Aspect

FIG. 4 is an exemplary side, partial cross-sectional view of a portion of a moisture path close-out and thermal control system 300 using an umbrella-shaped moisture close-out structure 302 as the moisture close-out structure 302. The umbrella-shaped structure 402 includes an opening 414. The opening 414 substantially aligns with the aperture 215 through the insulation layer 214 and receives at least a portion of the support beam 222 therethrough. In an aspect, the support beam 222 passes through the aperture 215 in the insulation layer 214 and the opening 414 in the umbrella-shaped structure 402 and connects on an outboard side of the system 300 (with respect to the insulation layer 214) and on an inboard side (with respect to the insulation layer 214) to a portion of the inner wall of the aircraft 100 and/or aircraft components 224. In an aspect of the disclosure, the coupling mechanism 304 includes a frusto-conical shaped flange 404 through which passes the support beam 222 and/or which is attached or integral to the support beam 222. It should be noted that in this example, the flange 404 is frusto-conical in shape to match the general shape of the umbrella-shaped structure 402; in other examples, where the moisture path close-out structure 302 is another shape (i.e. not conical), the coupling mechanism 304 might be shaped differently. The flange 404 is configured to be reversibly attached to the support beam 222, in some aspects.

The umbrella-shaped structure 402 is positioned with respect to the flange 404 such that droplets 230 flow down the support beam 222, flow over the flange 404 and over, but not through, the coupling between the flange 404 and the umbrella-shaped structure 402 and onward onto the insulation layer 214, where it continues around on the water-proof insulation layer 214 to the bottom 250 of the fuselage 130 (due to gravitational force 150). In an aspect of the disclosure, this means that the upper end of the umbrella-shaped structure 402 is positioned within a flange cavity 408 of the flange 404 and on the side of the insulation layer 214, such that at least a portion of the flange 404 overlays the top of umbrella-shaped structure 402.

In an aspect, the flange 404 is located on the support beam 222 such that when the umbrella-shaped structure 402 is coupled to it, the upper end of the umbrella-shaped structure 402 is higher than the insulation layer 214, providing a downward slope to the umbrella-shaped structure 402 from the support beam 222 towards the insulation layer 214. In an aspect, the distance between the flange 404 and the insulation layer 214 depends on the insulation blanket used and the angle of the support beam 222. In an aspect, the material of the umbrella-shaped structure 402 is configured to be slack enough to allow for movement of the support beam 222 without imparting a load on the material or insulation layer 214. In some aspects, the coupling between the umbrella-shaped structure 402 and the flange 404 pulls the umbrella-shaped structure 402 in an outboard direction and away from the insulation layer 214 to create a slope.

In an aspect of the disclosure, a plug 406 is also placed around the support beam 222, but shaped to fit within the flange cavity 408 and press the umbrella-shaped structure into the flange 404, thereby securing the umbrella-shaped structure 402 between the flange 404 and the plug 406. In some aspects, the umbrella-shaped structure 402 is secured to the plug 406 additionally or alternatively to being secured to the flange 404. In some aspects, the plug 406 is compressible (and larger in diameter than the flange cavity 408) such that when the plug 406 is pushed up into the flange cavity 408 of the flange 404, the plug 406 compresses and secures the umbrella-shaped structure 402 via a compression fit and/or friction fit of the plug 406 within the flange 404. In some aspects, the umbrella-shaped structure 402 is secured to the plug 406 and/or the plug 406 is secured within the flange cavity 408 using adhesive, fasteners, tabs, screws and/or nails, stitching, wrapping, hook and pile fastener, zip-tie, threading (like a screw), an external pressure exerting device (such as described with respect to FIG. 4), and/or other device and/or method functionally sufficient to secure in a moisture impermeable manner. The umbrella-shaped structure 402 is reversibly attached to the support beam 222, in some aspects.

In an aspect, the volume 412 between the umbrella-shaped structure 402 and the insulation layer 214 is filled with a material/filler 410 (shown partially in FIG. 4), for example, to prevent condensation from collecting in the volume 412 and/or to assist with mechanically holding the plug 406 in the flange cavity 408 by filling the volume 412 to an extent that the plug 406 is mechanically pushed into the flange cavity 408.

It should be understood that the view of FIG. 4 is of a single support beam 222 with a moisture path close-out and/or thermal control system 300 in place, and that similar configurations are optionally repeated at other support beams in the aircraft 100 where the system 300 would be of benefit for reducing precipitation of liquid moisture in the cabin 202. In some aspects, the aircraft 100 is configured with systems 300 on some or all support beams, which are located at or above where the width of the fuselage 130 is at its greatest from the cross-sectional perspective of FIG. 2.

FIG. 5 is a top view (from an outboard perspective looking inboard) of a portion of a moisture path close-out and thermal control system 300, including an umbrella-shaped structure 402 located within a flange 404. In an aspect, both the umbrella-shaped structure 402 and the flange 404 are positioned around the support beam 222. In some aspects of the disclosure, the umbrella-shaped structure 402 is fastened to the insulation layer 214 at least with a first seam 502 and optionally, with one or more additional seams 504 to prevent moisture from penetrating the junction between the umbrella-shaped structure 402 and the insulation layer 214. In an aspect of the disclosure, the seams 502, 504 are joined in a water impermeable fashion using an adhesive, stitching, and/or any of the other securing methods described herein and/or available in the art. In an aspect, and as shown in FIG. 5, the material of the umbrella-shaped structure 402 does not need to completely cover the surface of the insulation layer 214 because the insulation layer 214 is already typically waterproof and the extra material would add unnecessary weight. In an aspect, the insulation layer 214 would include the umbrella-shaped structure 402 as a patch coupled over a predefined hole/aperture 215 through the insulation layer 214.

An access seam 506 is optionally provided to the umbrella-shaped structure 402, for example to allow access through the system 300, either from inboard going outboard, or vice versa, for example for access during installation of the system 300. In an aspect, the access seam 506 is water/moisture impermeable when closed. In some aspects, the access seam is water and vapor proof, using for example a water and vapor impermeable zipper and/or a hook and loop seam.

It should be understood that while the support beam 222 is shown as being circular in shape, the support beam 222 could be any shape and where the moisture path close-out structure 302 and the coupling mechanism 304 are configured to match that shape in order to effectively render the junction between the support beam 222 and the insulation layer 214 water impermeable, particularly from the outboard towards inboard direction.

Temperature Control Support Beam Aspect

Figure 6:
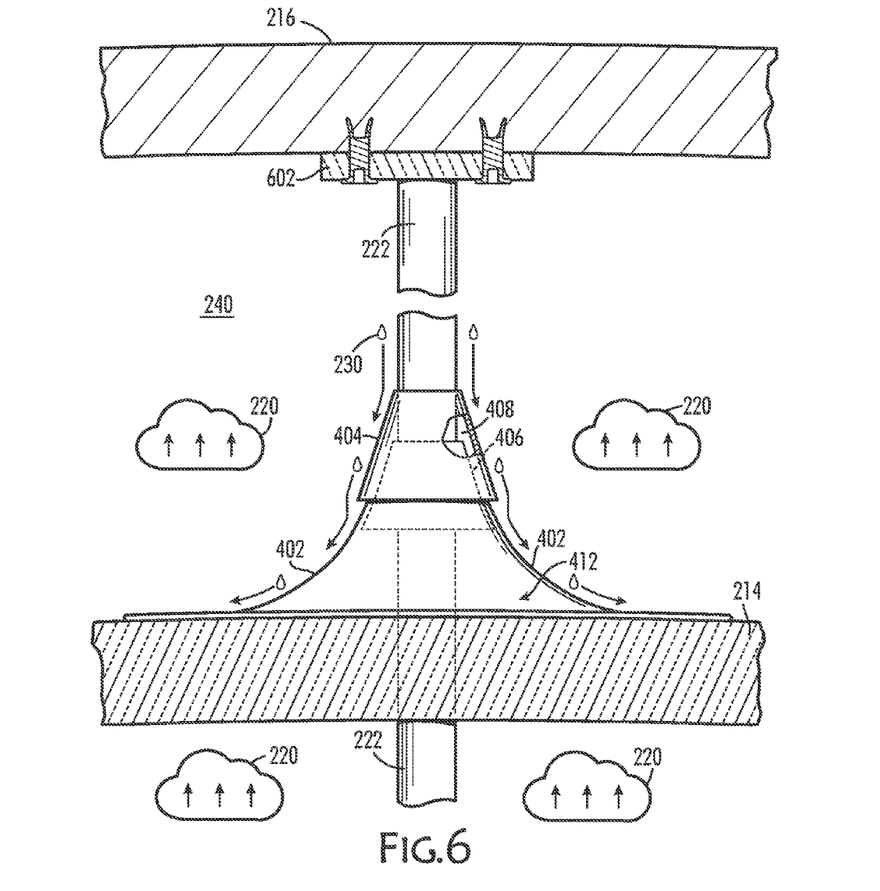
FIG. 6 is a side view of a support beam with an insulating layer.

In some aspects, temperature control is utilized to maintain the support beam 222 above the dew point, at least in areas inboard of the moisture path close-out structure 302 and/or the insulation layer 214, to minimize condensation. FIG. 6 is a side view of a support beam 222 with an insulating layer 602 positioned between the support beam 222 and the outer wall 216 (or wherever outboard of the insulation layer 214 the support beam 222 attaches) of the aircraft 100, in an aspect of the disclosure. In an aspect, the insulating layer 602 is used to control the temperature of the support beam 222 by limiting the direct heat transfer path between the cold outer wall 216 (at altitude) and the support beam 222, ideally reducing condensation of moisture 220 present in the space 240. Alternatively or additionally, an insulating layer is similarly positioned on the inboard side of the support beam facing the inner wall (or wherever inboard of the insulation layer 214 the support beam 222 attaches). In an aspect, the insulating layer 602 is secured to the outer wall 216 using any of the methods described herein and/or known to those skilled in the art.

In an aspect, the support beam 222 is insulated over its entire length, for example, being coated with an insulating material and/or being wrapped in a layer of insulation and/or being constructed of a material which has a lower thermal conductivity relative to conventional aircraft construction materials.

Method of Assembly Aspect

Figure 7:
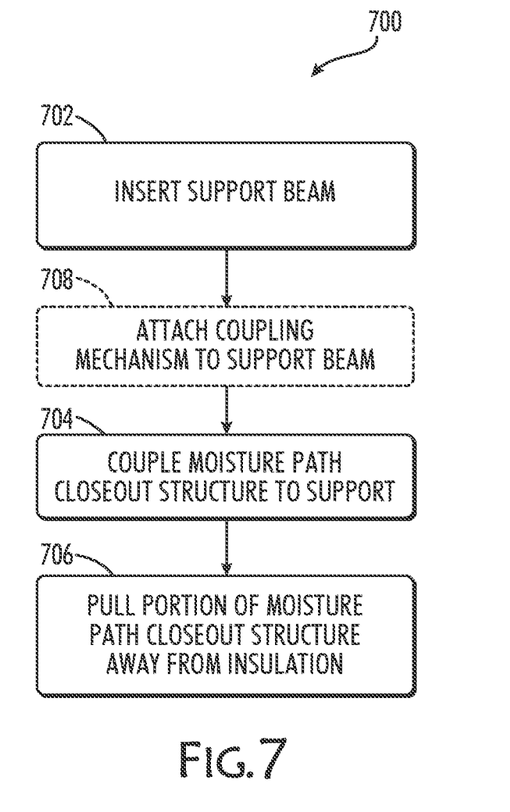
FIG. 7 is a flowchart of a method for assembling a moisture control assembly.

FIG. 7 is a flowchart of a method (700) for assembling a moisture path close-out and thermal control system 300. In an aspect, the support beam 222 is inserted (702) through an aperture 215 defined through the insulation layer 214 and an opening defined through the moisture path close-out structure 302. In some aspects, the moisture path close-out structure 302 is previously coupled to the insulation layer 214, for example, during manufacture of the insulation layer 214. The moisture path close-out structure 302 is coupled (704) to the support beam 222 by the coupling mechanism 304 such that a portion of the moisture path close-out structure 302 is pulled (706) away from the insulation layer 214 to impart a slope to the moisture path close-out structure 302 directing liquid moisture flow down from the support beam 222 and towards the insulation layer 214. In an aspect, the coupling (704) is achieved by securing the moisture path close-out structure 302 between the flange 404 and the plug 406. In an aspect, the moisture path close-out structure 302 is the umbrella-shaped structure 402 described elsewhere herein. In an aspect, the coupling mechanism 304 is attached (708) to the support beam 222 prior to coupling (704) the moisture path close-out structure 302 to the support beam 222, for example, where the support beam 222 is being retro-fitted to accept the moisture path close-out and thermal control system 300.

The terms "comprises", "comprising", "includes", "including", "having" and their conjugates mean "including but not limited to".

As used herein, the singular form "a", "an", and "the" include plural references unless the context clearly dictates otherwise. For example, the term "a compound" or "at least one compound" may include a plurality of compounds, including mixtures thereof.

Throughout this application, various aspects or features may be presented in a range format. It should be understood that the description in range format is merely for convenience and brevity and should not be construed as an inflexible limitation on the scope of the application. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

It is appreciated that certain features of the application, which are, for clarity, described in the context of separate aspects, may also be provided in combination in a single aspect. Conversely, various features of the application, which are, for brevity, described in the context of a single aspect, may also be provided separately or in any suitable subcombination or as suitable in any other described aspect of the application. Certain features described in the context of various aspects are not to be considered essential features of those aspects, unless the aspect is inoperative without those elements.

Although specific aspects are described in the application, it is evident that many alternatives, modifications and variations will be apparent to those skilled in the art. Accordingly, it is intended to embrace all such alternatives, modifications and variations that fall within the spirit and broad scope of the appended claims.

Citation or identification of any reference in this application shall not be construed as an admission that such reference is available as prior art to the present application, however, to the extent that any citation or reference in this application does not contradict what is stated herein, it is incorporated by reference. To the extent that section headings are used, they should not be construed as necessarily limiting.

The variations and alternatives of the present disclosure relate to, but are not limited to, components and parts designed to be positioned on the exterior or interior of objects including, without limitation, atmospheric and aerospace vehicles and other objects, and structures designed for use in space or other upper-atmosphere environments such as, for example, manned or unmanned vehicles and objects. Contemplated objects include, but are not limited to vehicles such as, for example, aircraft, spacecraft, satellites, rockets, missiles, bombs, ballistic etc. and therefore include manned and unmanned aircraft, spacecraft, terrestrial, non-terrestrial, and even surface and sub-surface water-borne vehicles and objects.

What is claimed is:

1. A moisture control assembly for use with a support beam extending through an insulation layer, the insulation layer positioned between an outer wall and an inner wall, the assembly comprising:
   a moisture path close-out structure coupled to the insulation layer at an aperture defined through the insulation layer, the moisture path close-out structure including an opening substantially aligned with the aperture and configured to receive the support beam therethrough; and
   a coupling mechanism comprising a flange coupled to the support beam to have direct contact with the support beam and that extends over a portion of the moisture path close-out structure and directly contacts and secures the moisture path close-out structure to the support beam, the coupling mechanism and the moisture path close-out structure configured to direct liquid flow down and away from the support beam and along an outboard surface of the insulation layer, the coupling mechanism being directly coupled to the moisture path close-out structure to pull the moisture path close-out structure in a direction away from the insulation layer;
   wherein the coupling mechanism further comprises a plug positioned between the moisture path close-out structure and the support beam at a section where the moisture path close-out structure and the coupling mechanism overlap to secure the moisture path close-out structure between the coupling mechanism and the plug.

2. A moisture control assembly according to claim 1, wherein the coupling mechanism and moisture path close-out structure restrict air flow through the aperture when the moisture path close-out structure is secured to the support beam and coupled to the insulation layer.

3. A moisture control assembly according to claim 1, wherein the moisture path close-out structure is coupled to the insulation layer facing the outer wall.

4. A moisture control assembly according to claim 1, wherein the moisture path close-out structure is a patch placed over the insulation layer.

5. A moisture control assembly according to claim 1, wherein the flange diverges towards the insulation layer.

6. A moisture control assembly according to claim 1, wherein the moisture path close-out structure is attached to a side of the flange facing the insulation layer.

7. A moisture control assembly according to claim 1, wherein the moisture path close-out structure is secured to the plug.

8. A moisture control assembly according to claim 1, wherein the moisture path close-out structure is secured to the support beam by at least one of compression fit and friction fit between the flange and the plug.

9. A moisture assembly according to claim 1, wherein the coupling mechanism further comprises at least one fastener screw or tab or adhesive to attach the plug to the flange.

10. A moisture control assembly according to claim 1, further comprising a filler material disposed between the moisture path close-out structure and the insulation layer to fill a volume between the moisture path close-out structure and the insulation layer.

11. A moisture control assembly according to claim 10, wherein the filler material mechanically presses the plug into a flange cavity formed against the support beam where the moisture path close-out structure and the coupling mechanism overlap.

12. A moisture control assembly according to claim 1, wherein the moisture path close-out structure is an umbrella-shaped structure.

13. A moisture control assembly according to claim 1, further comprising an insulating material positioned between the support beam and at least one of the inner wall and outer wall.

14. A moisture control assembly according to claim 1, further comprising an insulating material wrapped around at least a portion of the support beam.

15. A method for assembling a moisture path close-out and thermal control system for use with a support beam extending through an insulation layer, the insulation layer positioned between an outer wall and an inner wall, the method including:
   inserting the support beam through an aperture defined through the insulation layer and an opening defined through a moisture path close-out structure, the moisture path close-out structure directly coupled to the insulation layer;
   coupling the moisture path close-out structure to the support beam using a coupling mechanism wherein the coupling mechanism directly contacts the moisture path close-out structure;
   pressing the moisture path closeout structure into an overlapping section of the coupling mechanism with a plug that is positioned between the support beam and the moisture path closeout structure;
   pulling a portion of the moisture path close-out structure away from the insulation layer to impart a slope to the moisture path close-out structure; and,
   directing liquid flow down the support beam away from the support beam and along the insulation layer.

16. A method according to claim 15, wherein the step of coupling comprises securing the moisture path close-out structure between a flange located on the support beam and the plug inserted therein.

* * * * *